United States Patent [19]
Taber et al.

[11] Patent Number: 5,676,046
[45] Date of Patent: Oct. 14, 1997

[54] CONVERSION BROILER ASSEMBLY

[75] Inventors: Bruce E. Taber, Bothell; Bradley Allen, Redmond; Michael Quiring, Seattle; Bradley J. Miner, Bellevue, all of Wash.

[73] Assignee: Lang Manufacturing Company, Redmond, Wash.

[21] Appl. No.: 712,583

[22] Filed: Sep. 13, 1996

[51] Int. Cl.[6] .................................................. A47J 37/06
[52] U.S. Cl. .................. 99/340; 99/349; 99/379; 99/385; 99/401
[58] Field of Search .................. 99/328–335, 339, 99/340, 349, 357, 375–379, 372, 353–355, 385–401, 425, 426, 447; 100/93 P, 266; 126/41 R, 39 G; 16/375; 219/524; 426/233, 523

[56] References Cited

U.S. PATENT DOCUMENTS

| | | | |
|---|---|---|---|
| 4,165,682 | 8/1979 | Weiss | 99/331 |
| 4,483,239 | 11/1984 | Mueller et al. | 99/340 |
| 4,601,237 | 7/1986 | Harter et al. | 99/379 X |
| 4,697,504 | 10/1987 | Keating | 99/331 |
| 4,763,571 | 8/1988 | Bergling et al. | 99/349 |
| 4,878,424 | 11/1989 | Adamson | 126/39 G |
| 4,987,827 | 1/1991 | Marquez | 99/425 X |
| 5,197,377 | 3/1993 | Jennings et al. | 99/349 |
| 5,247,874 | 9/1993 | George, II et al. | 99/353 X |
| 5,287,919 | 2/1994 | George, II et al. | 165/170 |
| 5,341,727 | 8/1994 | Dickson | 100/93 P |
| 5,531,155 | 7/1996 | Pellicane et al. | 99/372 X |
| 5,555,794 | 9/1996 | Templeton et al. | 99/349 |

*Primary Examiner*—Timothy F. Simone
*Attorney, Agent, or Firm*—Seed and Berry L.L.P.

[57] ABSTRACT

A conversion broiler assembly to adapt a single-sided cooking apparatus to a double-sided cooking apparatus. The conversion broiler assembly has a rear housing that is mountable to the single-sided cooking apparatus. The rear housing movably receives left and right stanchions that are pivotally attached to left and right support arms with a broiler positioned therebetween. The left and right stanchions and support arms are generally hollow and provide passageways for combustion air, exhaust air, gas lines and electrical lines to and from the broiler. A rail system having two rails with running surfaces and one rail with an inclined running surface support rollers on the left and right stanchions to provide for smooth and easy lateral translation of the broiler relative to the rear housing. The conversion broiler assembly has a flue system for directing air flow and high temperature exhaust away from the assembly when in use while maintaining a substantially cool rear wall of the assembly. The broiler has an improved burner pattern with burner tiles positioned in a perimeter set of tiles surrounding and spaced apart from a smaller central set of tiles to provided even heat distribution across the broiler surface.

26 Claims, 9 Drawing Sheets

CONVERSION BROILER ASSEMBLY

TECHNICAL FIELD

The present invention relates generally to cooking devices, and more particularly, to conversion assemblies for adapting a single-sided cooking device to a double-sided cooking device and to double-sided cooking device improvements.

BACKGROUND OF THE INVENTION

Griddles and charbroilers that provide single-side cooking have been used for high volume food production because of their speed and volume in cooking. However, such single-side cooking devices cook only one side of the food at a time, so food must be turned by an attendant or an automated machine. To increase speed and efficiency of high volume cooking, double-sided cooking devices are used. The conventional double-sided cooking devices include a lower cooking surface that faces upwardly and on which food to be cooked is placed, and a top cooking surface that faces downwardly over the lower cooking surface to simultaneously cook both sides of the food. While the conventional double-sided cooking devices are substantially faster and more efficient than the single-sided cooking devices, many single-sided cooking devices exist and are in daily use.

To achieve some of the benefits of the double-sided cooking devices, single-sided cooking devices such as griddles have been fitted with removable, top-side contact cookers that have an upper griddle surface which is pressed against the food's top side. As an example, U.S. Pat. No. 4,483,239 and U.S. Pat. No. 4,165,682 disclose electrical top-side contact cookers that are mounted directly to a rear splash guard of a single-sided cooking griddle. Mounting the top-side contact cooker on the rear splash guard causes stresses that the rear splash guard was not designed to handle, so the size and weight of these removable top-side contact cookers are limited. As a result, the size of the cooking surface and the efficiency of the cooking provided by such removable top-side contact cookers is limited.

The conventional single-sided and double-sided cooking devices generate high temperature exhaust that is directed toward the back of the cooking device so as to avoid high temperatures at the from side where attendants typically stand. The exhaust is typically drawn rearwardly and upwardly away from the cooking device by a separate ventilating system positioned above the cooking device, which results in high temperatures behind the cooking device. As a result of these high temperatures, safety regulations require that cooking devices be spaced apart from a wall and other structures to avoid creating a fire hazard. However, the space behind the cooking devices is difficult to maintain in a clean and sanitary manner, and uses up valuable kitchen floor space. In addition, the mountable top-side contact cookers, such as those disclosed in U.S. Pat. Nos. 4,483,239 and 4,165,682, generate additional heat that must be considered when determining the necessary space behind the modified single-sided cooking device to ensure that a fire hazard is not created.

Conventional broilers also have heating elements, such as flames or electrical elements, that are mounted to a holder in a substantially uniform pattern in an attempt to provide uniform heating under the broiler. However, the evenly distributed heating elements do not provide an even heating pattern. The heat radiating elements or surfaces produce diminishing radiation from the center outward, which is well known as the shape factor in radiation heat transfer. Accordingly, the uneven heating pattern of the conventional broilers cause inefficient and uneven cooking.

A conventional double-sided cooking device having a permanent top-side gas broiler is adapted to provide gas and combustion air to the top-side broiler for generation of the broiler flames. The top-side broiler is pivotal relative to the lower cooking surface between raised and lowered positions, and a gas line is provided with a sealed swivel joint at a pivot area along the gas line. The sealed swivel joint allows the broiler to pivot while also allowing for a continuous gas flow to the broiler surface when the broiler is in the lower position so that the broiler flames can be accurately controlled. However, the swivel joint in the gas line causes a significant gas flow restriction and a relatively large pressure drop along the gas line. The large pressure drop in the gas line makes the top-side broiler more sensitive to gas pressure changes, thereby effecting the controllability and accuracy of broiler heat. Accordingly, such conventional doublesided cooking devices must be manufactured with great accuracy to ensure the top-side gas broilers will provide accurate and efficient broiling.

Additional factors that require accurate manufacturing of double-sided cooking devices with top-side broilers include the need to place electrical components in areas that will not be heated to unacceptably high levels, the need to control high temperature exhaust, and the need to provide combustion air in a controlled manner to ensure a proper gas and air mixture before the mixture is ignited to form the broiler flames. All of these factors and more have previously made add-on top-side broilers that are mountable to single-sided cookers undesirable. Some of these same problems are suffered by original equipment double-sided cooking devices.

SUMMARY OF THE INVENTION

The present invention is directed toward a conversion broiler assembly to adapt a conventional single-sided cooker to a double-sided cooker so as to achieve the benefits provided by a double-sided cooker and to overcome the drawbacks experienced with converted and original equipment prior art double-sided cookers. In a preferred embodiment of the invention, the conversion assembly comprises a rear housing that is mountable to the single-sided cooker, and that defines an interior area. A pair of spaced-apart broiler support members are connected to the rear housing and a broiler extends between the broiler support members. The broiler is pivotal relative to the rear housing between a lowered, cooking position and a raised, open position. The broiler support members and broiler are positioned to define an exhaust opening between the broiler support members such that the exhaust opening communicates with the interior area when the conversion assembly is mounted onto the single-sided cooker.

An exhaust flue system extends between the broiler support members partially in the exhaust opening and is positioned to control the flow of broiler and cooker exhausts generated during operation of the broiler and the single-sided cooker. The exhaust flue system has an exhaust separator that extends across the exhaust opening and divides it into upper and lower portions. The upper portion is adapted to receive the broiler exhaust and the lower portion is adapted to receive the cooker exhaust. The exhaust separator is sloped upwardly and rearwardly to direct the broiler exhaust upwardly and rearwardly relative to the rear housing in an exhaust layer that is adjacent to the cooker exhaust, such that the cooker exhaust is closer to a rear wall of the rear housing than the broiler exhaust when the conversion assembly is in use.

In the preferred embodiment, the exhaust flue system has a second exhaust separator spaced rearwardly apart from the first exhaust separator to form a cooker exhaust channel therebetween. The second exhaust separator is positioned to direct the cooker exhaust upwardly in a layer substantially adjacent to the layer of broiler exhaust. The second exhaust separator also directs a flow of wash air upwardly between the layer of griddle exhaust and the rear wall of the rear housing so as to keep the rear wall cool during operation of the broiler and the single-sided cooker. The preferred exhaust flue system also has a back flue spaced apart from the rear wall of the rear housing to define a double-wall structure at the back of the conversion broiler assembly. The double-walled structure keeps the rear wall of the rear housing cool during operation of the broiler, the single-sided cooker, or both.

The preferred embodiment of the conversion broiler assembly includes a rail system mounted to the rear housing. The broiler support members include first and second stanchions and first and second support arms which support the broiler. The first and second stanchions are movably supported on the rail system to allow the first and second stanchions, the first and second support arms and the broiler to move laterally as a unit relative to the rear housing. The left and right stanchions have vertically aligned rollers, and the rail system includes upper and lower horizontal rails having substantially vertical engagement surfaces that receive the rollers. The left and right stanchions have upper inclined rollers and the rail system also includes a top inclined rail with an inclined engagement surface that slopes downwardly and rearwardly relative to the rear wall of the rear housing. The inclined rail supports the inclined rollers and thereby supports the left and right stanchions in a selected vertical position relative to the rear housing and provide smooth lateral movement along the rails.

In the preferred embodiment, the first and second stanchions are spaced apart from each other and movably attached to the rear housing, and first and second support arms are pivotally attached to the first and second stanchions, respectively. The preferred broiler is a gas broiler that is connected to the first and second support arms, such that the broiler and the first and second support arms are pivotal as a unit relative to the first and second stanchions and relative to the rear housing. The first and second stanchions and the first and second support arms have passageways extending therethrough to allow for passage of combustion air to the broiler and cooling air from the broiler, respectively. One passageway also forms a raceway for gas and electrical lines. The passageway allows flexible portions of the gas and electrical lines to extend through the stanchion and extend into to the respective support arm without bending in a radius that is smaller than a minimum bend radius.

The rear housing has a hose-and-conduit housing portion that contains flexible lower portions of the gas and electrical lines. The hose-and-conduit housing retains the flexible lower portions in a selected position to allow the lower portions to partially move laterally with the left and right stanchions without binding, twisting, or bending with a radius that is less than the minimum bend radius.

The first stanchion has a first interior air passageway, and the first support arm has a second interior air passageway that communicates with the first air passageway in the first stanchion. The first support arm has a divider in the second air passageway to define first and second channels, which are interconnected at a forward end of the divider. The first support arm has a gas entry aperture therein that receives a discharge end of a gas fine. The gas entry aperture and the gas line's discharge end communicate with the first channel in the second air passageway so gas from the gas line is directed into the first channel of the second air passageway. The first and second channels form a mixing chamber in which the gas and air are mixed to provide a selected mixture. The first support arm has outlet apertures that communicate with the broiler to direct cooling air and the mixture of gas and air to the broiler.

The second support arm has an interior exhaust passageway that communicates with an interior exhaust passageway in the second stanchion. The second support arm has an exhaust inlet that communicates with the broiler to receive cooling air exhausted from the broiler and to carry it to the exhaust passageway in the second stanchion.

The broiler has a broiler housing that is connected to the first and second support arms and that defines a broiler interior area. The broiler housing contains upper and lower plenum members spaced apart from each other to define a plenum therebetween. The upper plenum member divides the broiler interior area into an upper portion and a lower portion which comprises the plenum. Electrical components of the broiler are positioned within the upper portion above the plenum.

The upper portion of the broiler interior area communicates with an air outlet in the first support arm to direct a flow of cooling air from the first support arm into the upper portion of the broiler and around the electrical components so as to cool the components. The upper portion of the broiler interior area communicates with the exhaust passageway in the second support arm to allow the air flowing through the upper portion of the broiler interior area to exit into the exhaust passageway in the second support arm.

The plenum in the lower portion of the broiler interior area communicates with another outlet in the first support arm and receives the gas and air mixture from the first support arm. The lower plenum member includes a plurality of burner tiles that define a broiler surface. The lower plenum member and the burner tiles have a plurality of apertures that communicate with the plenum to receive the gas and air mixture therethrough for ignition, thereby generating broiling heat for cooking. The burner tiles are positioned in a selected pattern on the lower plenum member to define an outer perimeter set of burner tiles and a smaller central set of burner tiles therewithin and spaced apart from the outer perimeter set so as to provide for even heat distribution when the broiler is in operation.

DETAILED DESCRIPTION OF THE INVENTION

Figure 1:
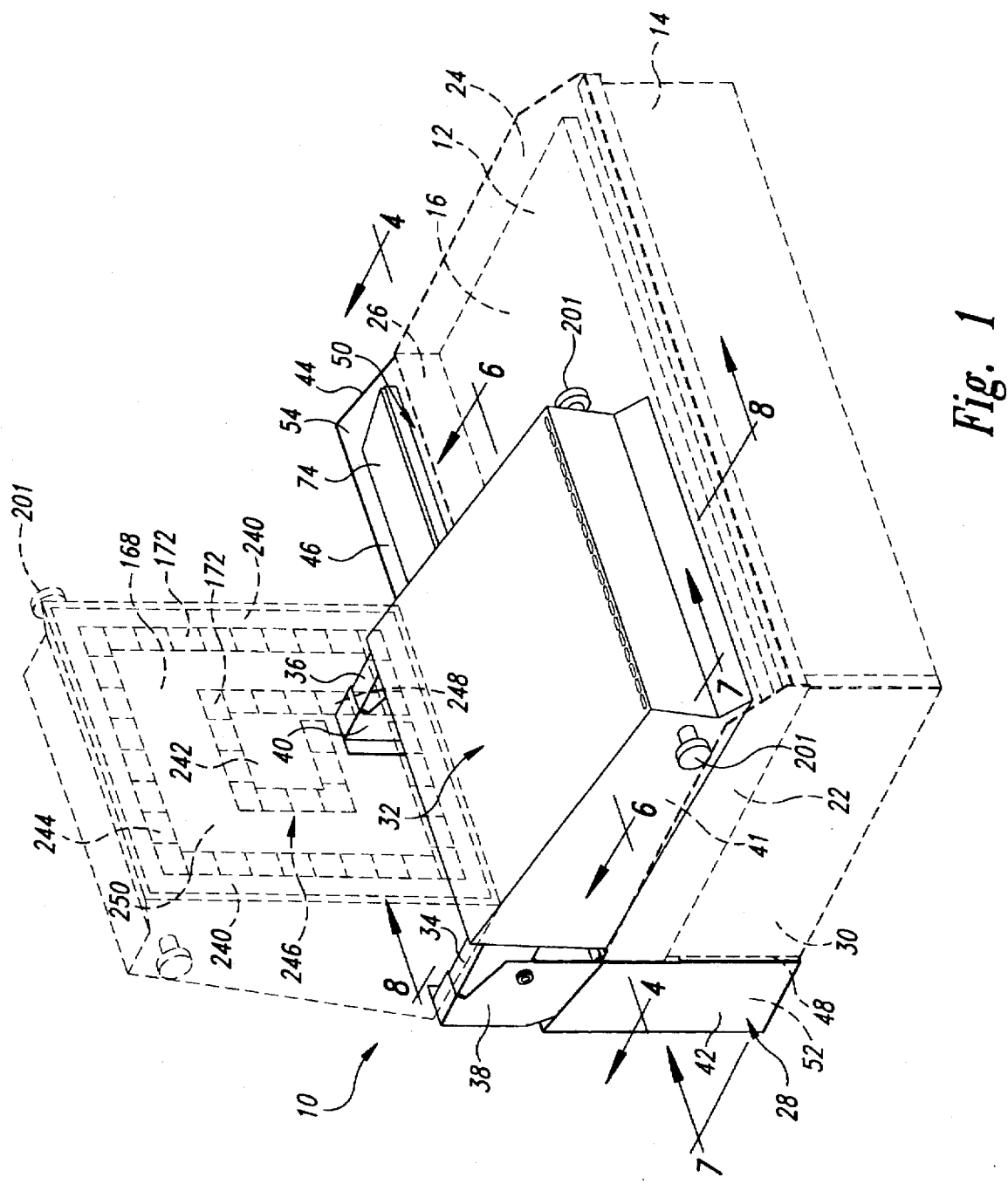
FIG. 1 is a top isometric view of a conversion broiler assembly in accordance with the present invention, with the assembly being shown mounted on a conventional single-sided griddle, illustrated in phantom lines, with a broiler being shown in solid lines in a lowered cooking position and in phantom lines in a raised, open position.

A conversion broiler assembly 10 in accordance with a preferred embodiment of the present invention is shown in the drawings for illustrative purposes. As best seen in FIG. 1, the conversion broiler assembly 10 is mountable to a conventional single-sided griddle 12, shown in phantom lines, to convert the single-sided griddle to a double-sided cooking device. The griddle 12 has a frame 14 that supports an upwardly facing cooking surface 16, and a left splash guard 22, a right splash guard 24, and a rear splash guard 26 at a rear side 30 of the griddle. These splash guards extend around three edges of the cooking surface to contain debris or material that may be generated while cooking on the griddle. For purposes of clarity of this specification, left and right references are taken from a perspective when viewing the griddle 12 from the front looking rearward.

The conversion broiler assembly 10 is mountable to the rear side 30 of the griddle 12, and the assembly has a rear housing 28 that is adapted to be securely fastened on the griddle rearward of the rear splash guard 26. The conversion broiler assembly 10 includes a left stanchion 38 and a right stanchion 40 that are laterally spaced apart from each other and are partially contained in the rear housing 28. The left and right stanchions 38 and 40 are structural support members extending substantially vertically out of an open top side 54 of the rear housing 28. A left support arm 34 and a right support arm 36 are pivotally connected to the left stanchion 38 and right stanchion 40, respectively, and a broiler 32 is securely mounted to the left and right support arms at a position above the cooking surface 16 of the griddle 12.

The left and right support arms 34 and 36 and the broiler 32 are pivotally movable as a unit relative to the left and right stanchions 38 and 40 between a lowered, cooking position, illustrated in solid lines in FIG. 1, and a raised, open position, shown in phantom lines in FIG. 1. In the lowered, cooking position, the left and right support arms 34 and 36 are substantially perpendicular to the left and right stanchions 38 and 40. The broiler 32 is supported between the left and right support arms 34 and 36 over the cooking surface 16 of the griddle 12, such that a broiler surface 41 (see FIG. 2) is a selected distance above the griddle's cooking surface. When the broiler 32 is in the raised, open position, the left and right support arms 34 and 36 extend upwardly and are in substantial vertical alignment with the left and right stanchions 38 and 40. Accordingly, the broiler surface 41 is exposed and generally faces forwardly.

In the preferred embodiment, a conventional counterbalance mechanism, such as a spring or the like, is interconnected between one of the left and right support arms 34 and 36 and the respective left and right stanchion 38 and 40 to allow the broiler 32 to be easily and smoothly lifted to the raised, open position and closed to the lowered, cooking position.

The left and right stanchions 38 and 40 are laterally movable relative to the rear housing 28 and relative to the cooking surface 16, such that the left and right stanchions, the left and right support arms 34 and 36, and the broiler 32 are laterally movable as a unit between a left position, shown in solid lines in FIG. 1, and a right position (not shown) to the right thereof but still over the cooking surface. In the left position, the left side of the broiler 32 is adjacent to the left splash guard 22, and in the right position, the right side of the broiler is adjacent to the right splash guard 24. Accordingly, the broiler 32 can be laterally positioned by the user to a desired position over the cooking surface 16 when the conversion broiler assembly 10 is mounted to the griddle 12.

Figure 2:
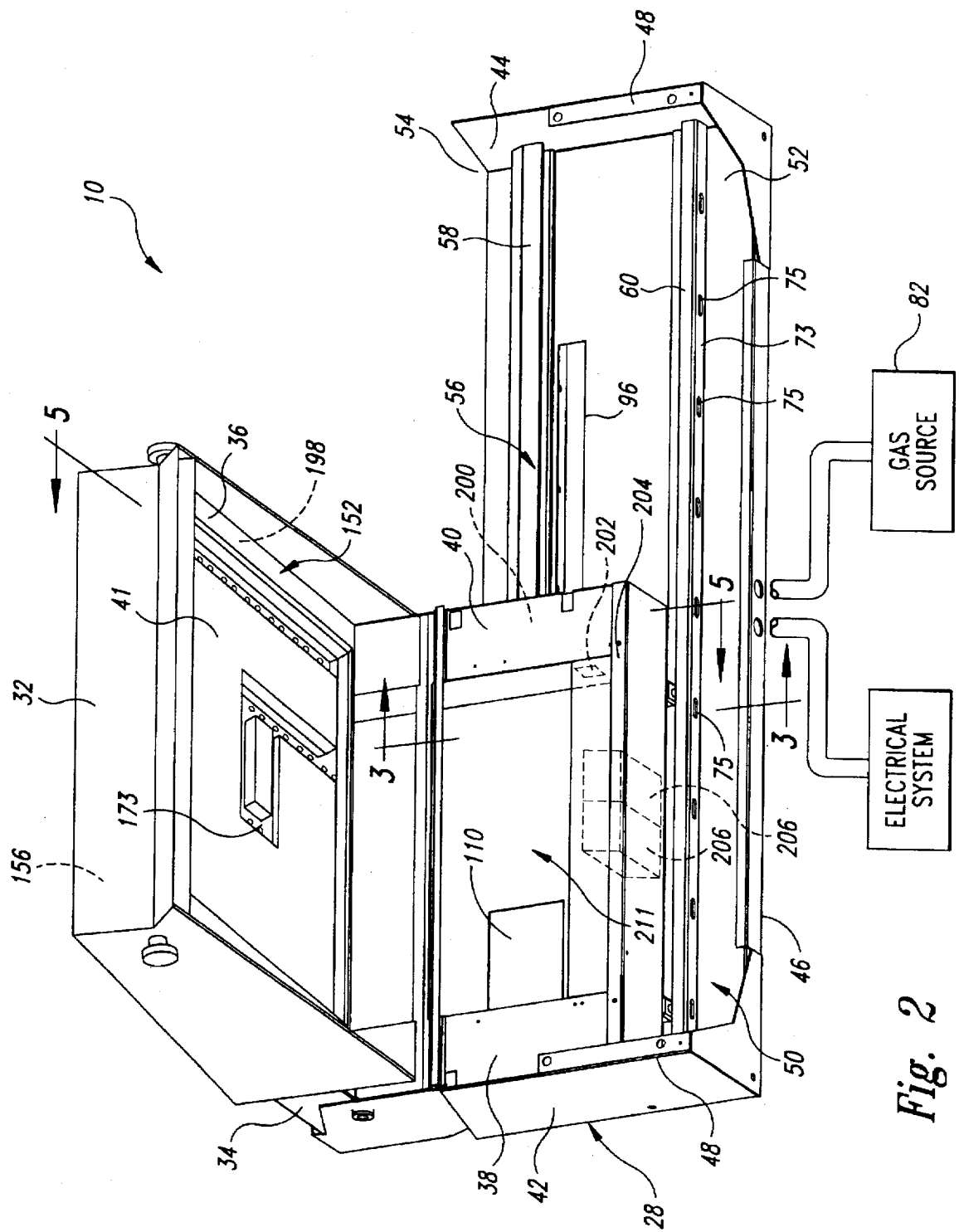
FIG. 2 is an enlarged bottom isometric view of the conversion broiler assembly of FIG. 1 shown removed from the griddle.

As best seen in FIGS. 1 and 2, the rear housing 28 has a left sidewall 42, a right sidewall 44, and a rear wall 46 extending therebetween. When the rear housing 28 is mounted to the griddle 12 (FIG. 1), the rear wall 46 is spaced apart from and rearward of the rear side 30 of the griddle. The left and right sidewalls 42 and 44 have inwardly extending mounting flanges 48 that are adapted to be securely fastened to the rear side 30 of the griddle 12 (FIG. 1) with threaded fasteners (not shown) to securely retain the conversion broiler assembly 10 on the griddle. The mounting flanges 48 are shaped and sized to allow the conversion broiler assembly 10 to be easily mounted to the rear side 30 of virtually any commercial griddle, charbroiler, or other similar cooking device.

The left and right sidewalls 42 and 44 and the rear wall 46 of the rear housing 28 are integrally connected such that, when mounted at the rear side 30 of the griddle 12, a housing interior area 50 is defined having an open bottom side 52 and the open top side 54. The open bottom and top sides 52 and 54 allow wash air to pass upwardly through the housing interior area 50 by natural convection during operation of the broiler 32 and the griddle 12. The open top side 54 also allows exhaust air and gas generated during operation of the broiler 32 and the griddle 12 to exit the housing interior area 50, as discussed in greater detail below.

Figure 3:
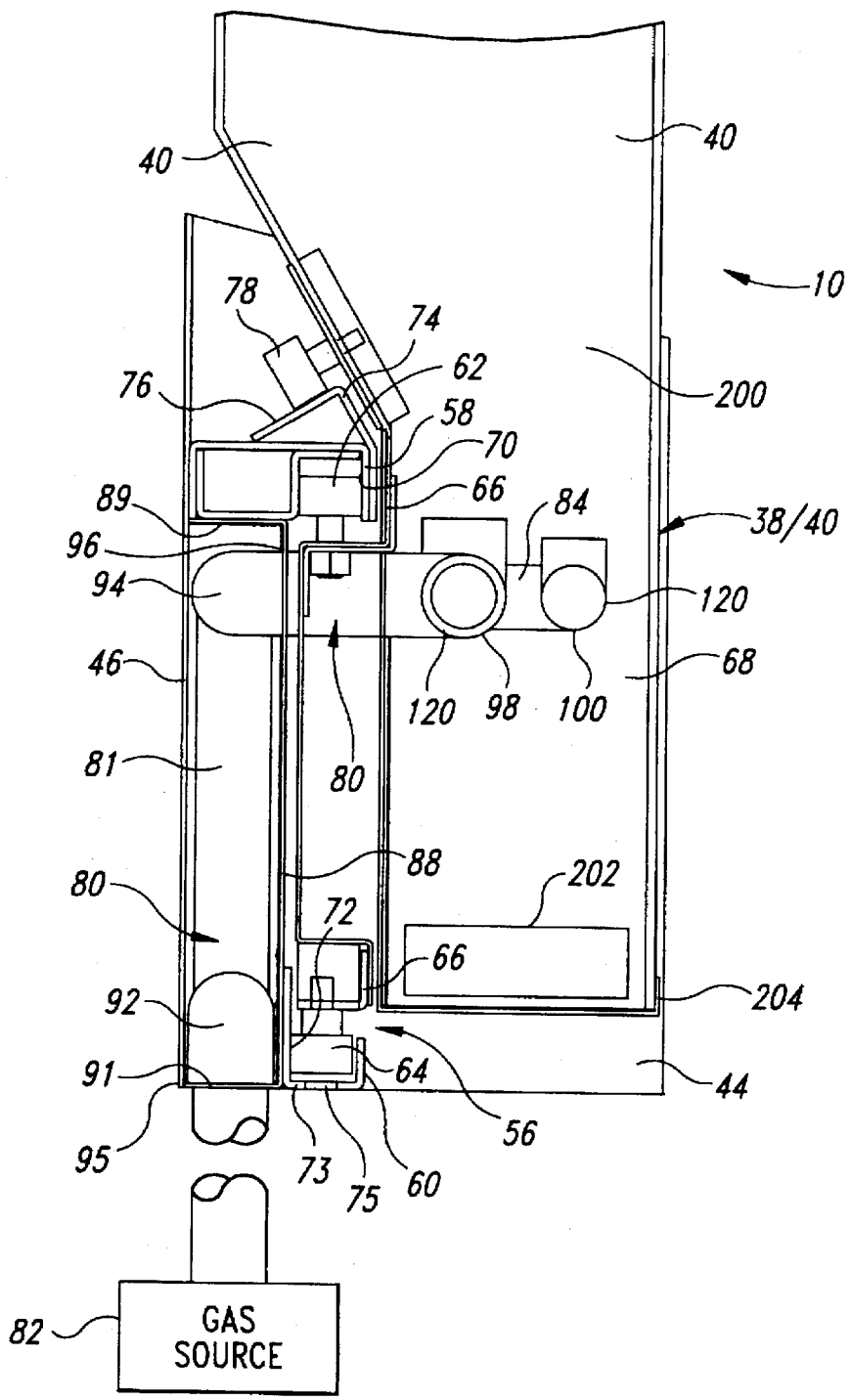
FIG. 3 is an enlarged cross-sectional left side view taken substantially along line 3—3 of FIG. 2 illustrating the structure contained within a rear housing.

As best seen in FIG. 2, the left and right stanchions 38 and 40 are movably mounted to a rail system 56 that is attached to the rear wall 46 of the rear housing 28. The rail system 56 allows the left and right stanchions 38 and 40 to translate laterally between the left sidewall 42 and the right sidewall 44 of the rear housing 28. Each of the left and right stanchions 38 and 40 have rollers (not shown in FIG. 2) that travel along the rail system 56, as will be described below with respect to FIG. 3. The left and right stanchions 38 and 40 have the same roller configuration, so only the right stanchion is illustrated in FIG. 3 and will be discussed. The discussion is equally applicable to the left stanchion.

As best seen in FIG. 3, the right stanchion 40 has an upper roller 62 and a lower roller 64, both positioned in a vertical plane and oriented in vertical alignment having their axes of rotation aligned in the vertical plane. The upper and lower rollers 62 and 64 are mounted with contoured bracketry 66 to a lower portion 68 of the stanchion. The rail system 56 has a horizontal upper rail 58 and a horizontal lower rail 60 that are substantially parallel and extend along the length of the rear housing 28. The upper rail 58 has an inverted, downwardly open, generally U-shaped cross-sectional shape that receives the upper roller 62 therein. The upper roller 62 rolls along a forward vertical running surface 70 of the upper rail 58. The lower rail 60 has an upwardly open, generally U-shaped cross-sectional shape that receives the lower roller 64 therein. The lower roller 64 rolls along a rear vertical running surface 72 of the lower rail 60.

As best seen in FIGS. 2 and 3, the lower rail 60 of the preferred embodiment has a horizontal bottom wall 73 below the rear vertical running surface 72, and the bottom wall 73 has a plurality of slots 75 extending therethrough. The slots 75 are sized so debris which has fallen into the lower rail 60 can pass through the lower rail's bottom wall 73, thereby keeping the lower rail clear of debris that could interfere with the lower roller 64.

The upper and lower rollers 62 and 64 engage only the vertical running surfaces 70 and 72, respectively to keep the left and right stanchions 38 and 40 vertically oriented and to support the left and right stanchions against bending moments caused by the weight of the broiler 32 and the left and right support arms 34 and 36. The upper and lower rollers 62 and 64 do not vertically support the left and right stanchions 38 and 40 to maintain the vertical position of the stanchions relative to the rear housing 28. This is achieved by a top inclined rail 74 that supports the left and right stanchions 38 and 40. As best seen in FIG. 3, the top inclined rail 74 has an angled, generally L-shaped cross-section. The top inclined rail 74 is securely positioned above the upper rail 58 such that the top inclined rail has an inclined running surface 76 that slopes rearwardly and downwardly toward the rear wall 46 of the rear housing 28.

The right stanchion 40 has a top inclined roller 78 mounted to the lower portion 68 of the stanchion at a position above the upper roller 62 so as to rollably engage the inclined running surface 76. The top inclined roller 78 rolls along the inclined running surface 76 and vertically supports the right stanchion 40 at a selected vertical position relative to the rear housing 28. As a result, the upper and lower rollers 62 and 64 are also vertically supported by the top inclined roller 78 in proper position to rollably engage the upper and lower rails 58 and 60.

The bending moments caused by the weight of the broiler 32 and the left and right support arms 34 and 36 hold the upper roller 62 in firm engagement with the forward vertical running surface 70 of the upper rail 58 and the lower roller 64 in firm engagement with the rear vertical running surface 72 of the lower rail 60. The top inclined rail 74 and the top inclined roller 78 are positioned at an angle so as to minimize the horizontal reaction loads on the upper and lower rollers 62 and 64. This minimizing of the horizontal reaction loads also minimizes the rolling resistance between the upper and lower rollers 62 and 64 and their respective forward and rear vertical running surfaces 70 and 72. As a result, the top inclined roller 78 and the upper and lower rollers 62 and 64 travel smoothly along the top inclined rail 74 and the upper and lower rails 58 and 60, respectively.

In an alternate embodiment, the left and right stanchions 38 and 40 are fixedly mounted to the rear housing 28 so they are not movable laterally relative to the rear housing. This alternate embodiment does not have the rail system 56 and the left and right stanchions 38 and 40 do not include the upper, lower, and top inclined rollers 62, 64, and 78, respectively.

In the preferred embodiment, the broiler 32 is a gas broiler that uses natural gas, propane gas, or any suitable mixture of combustible gas to generate broiling heat at the broiler surface 41. In alternate embodiments of the invention, the broiler 32 is an electric broiler using electricity to generate the broiling heat. In one alternate embodiment, the electric broiler is cooled by a flow of cooling air provided by the stanchions and support arms, as discussed below. In another alternate embodiment, no flow of cooling air is provided to the electric broiler through the stanchions and support arms. The following description applies equally to the gas and electric broiler embodiments with the flow of cooling air being provided, except for the discussion regarding the passage of the gas line through the conversion broiler assembly 10 to provide gas to the broiler.

Figure 4:
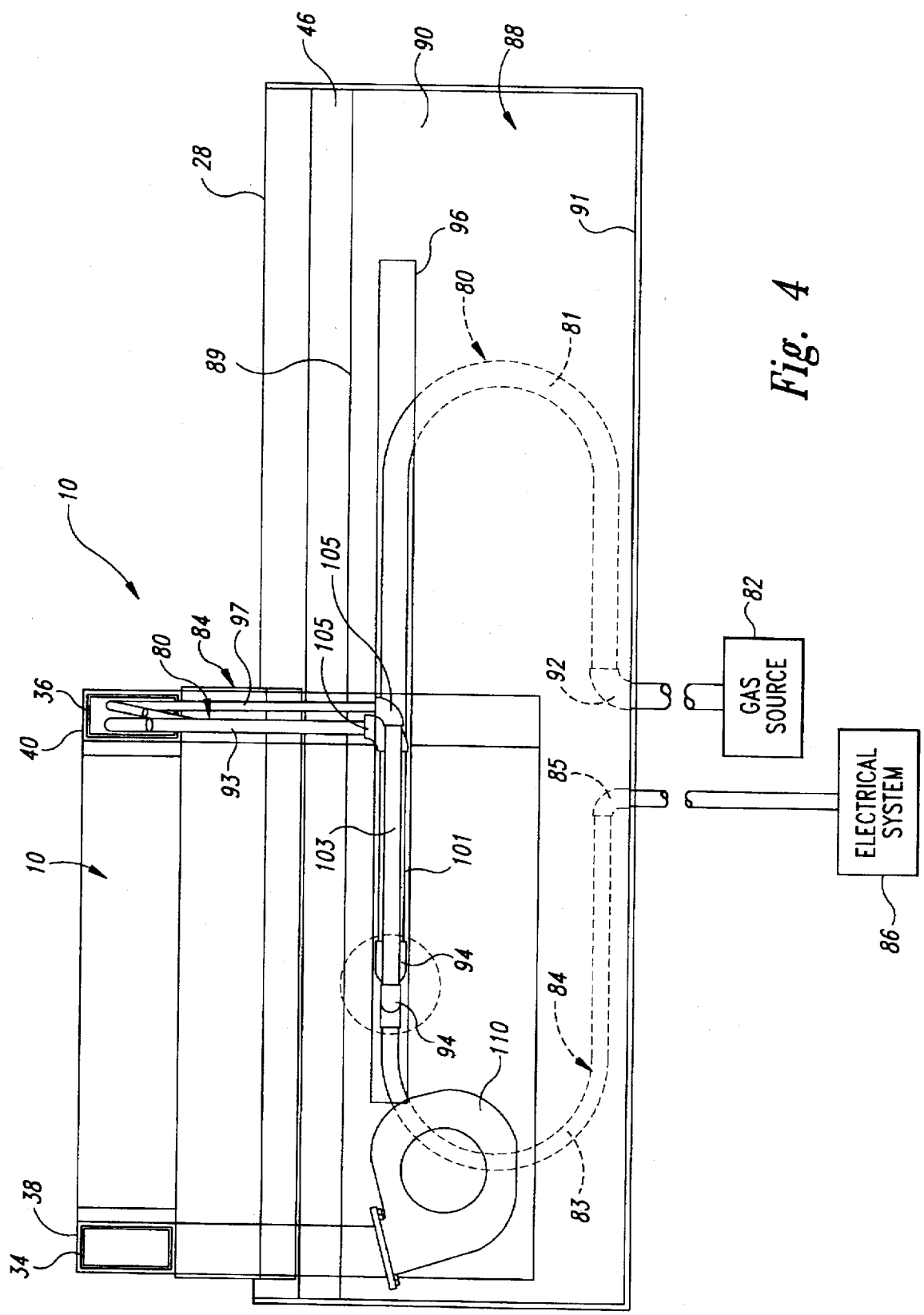
FIG. 4 is an enlarged cross-sectional front view taken substantially along line 44 of FIG. 1 illustrating a hose-andconduit housing portion of the rear housing, with a gas hose portion and an electrical conduit portion shown in broken lines without a rail system being shown for purposes of clarity.

As best seen in FIGS. 3 and 4, the conversion broiler assembly 10 includes a gas line 80 that provides a selected flow of gas from a conventional gas source 82 to the broiler 32. The conversion broiler assembly 10 also has an electrical line 84 that provides electricity to the assembly from a conventional electrical system 86. The gas line 80 and the electrical line 84 are partially contained in a hose-and-conduit housing 88 that is securely mounted to the rear wall 46 of the rear housing 28. The hose-and-conduit housing 88 is an elongated, open sided box structure having opposing top and bottom sidewalls 89 and 91 attached to the rear wall 46 of the rear housing 28, and a forward wall 90 spaced apart from and forward of the rear wall and extending between the top and bottom sidewalls.

As best shown in FIG. 4, the hose-and-conduit housing 88 contains a flexible, lower hose portion 81 of the gas line 80 that is connected to a lower elbow fitting 92 extending through the bottom sidewall 91. The lower elbow fitting 92 is connectable to the gas source 82. The hose-and-conduit housing 88 also contains a flexible lower conduit portion 83 of the electrical line 84 having electrical wire therein. The lower conduit portion is connected to a lower electrical fitting 85 that extends through the bottom sidewall 91 and connects to the electrical system 86. The lower hose portion 81 and the lower conduit portion 83 are arranged in a vertical plane trapped between the rear wall 46 of the rear housing 28 and the forward wall 90 of the hose-and-conduit housing 88 to maintain this arrangement. The lower hose portion 81 and the lower conduit portion 83 extend horizontally above the bottom sidewall 91 away from the respective fitting 92 and 85 to which they are attached and away from each other, then curve upwardly toward the top sidewall 89, turn back toward each other near the top sidewall 89, and terminate at respective upper line connectors 94 located adjacent to each other. The upper line connectors 94 are positioned between the left and right stanchions 38 and 40. Accordingly, the lower hose portion 81 and lower conduit portion 83 bend or bow away from each other and together define an oval-shaped configuration within the hose-and-conduit housing 88.

The lower hose portion 81 and the lower conduit portion 83 each have a sufficient stiffness so as to bend in a radius that does not exceed a selected minimum bend radius as the left and right stanchions 38 and 40 are moved laterally with the broiler 32 as described above. The minimum bend radius of each of the lower hose portion 81 and the lower conduit portion 83 is the selected bending limit whereat the lower hose portion and lower conduit portion do not bend beyond their elastic limit. By not bending the lower hose portion 81 and the lower conduit portion 83 past the minimum bend radius, fatigue in the lower hose and conduit portions is minimized and a desired gas flow through the gas line 80 can be maintained. Therefore, the lower hose portion 81 and the lower conduit portion 83 are sufficiently stiff to maintain the generally elongated oval configuration within the hose-and-conduit housing 88.

In the preferred embodiment, the distance between the forward wall 90 of the hose-and-conduit housing 88 and the rear wall 46 of the rear housing 28 is slightly greater than the diameter of the lower hose portion 81. Accordingly, forward and rearward movement of the lower hose portion 81 and the lower conduit portion 83 is minimized. The limited distance between the forward wall 90 and the rear wall 46 prevents twisting and possible kinking of the lower hose portion 81 and lower conduit portion 83 during lateral movement of the left and right stanchions 38 and 40.

As best seen in FIG. 4, the forward wall 90 of the hose-and-conduit housing 88 has an elongated slot 96 therein that extends between left and right side portions of the forward wall 90. Each of the upper line connectors 94 extends forwardly through the elongated slot 96 away from the forward wall of the hose-and-conduit housing 88 and interconnect the lower hose portion 81 to a rigid horizontal gas line portion 101 and the lower conduit portion 83 to a rigid horizontal electrical conduit portion 103. The rigid gas line portion 101 and the rigid electrical conduit portion 103 extend away from the upper line connectors 94 and are securely connected to the right stanchion 40.

When the left and right stanchions 38 and 40 are laterally moved relative to the rear housing 28, the rigid gas line portion 101, the rigid electrical conduit portion 103, and the upper line connectors 94 also move laterally, such that the upper line connectors travel along the length of the elongated slot 96. As the upper line connectors 94 move laterally, the flexible lower hose portion 81 and the flexible lower conduit portion 83 are pulled or pushed laterally within the hose-and-conduit housing 88 while the lower fittings 92 and 85 remain stationary. Accordingly, the lower hose portion 81 and lower conduit portion 83 move in a motion within the hose-and-conduit housing 88 that generally corresponds to rotational movement of a tractor tread. Each of the lower hose portion 81 and the lower conduit portion 83 have a length that is sufficient to allow the left and right stanchions 38 and 40 to be moved unrestricted fully between the left and right sides of the rear housing 28 without the lower hose portion or the lower conduit portion bending in a radius that is less than the minimum bend radius.

The gas line 80 and the electrical line 84 each include a pass-through fitting 105 that connects a respective one of the horizontal, rigid gas line portion 101 and the rigid electrical conduit portion 103 to a flexible upper gas hose portion 93 or a flexible upper electrical conduit portion 97 which extends through an upper portion of the right stanchion 40. As discussed in greater detail below, the right stanchion 40, the left stanchion 38, the right support arm 36, and the left support arm 34, are substantially hollow members defining combustion air and cooling passageways therethrough that communicate with the broiler 32. The hollow right stanchion 40 and the hollow right support arm 36 also provide an interior raceway for the gas and electrical lines 80 and 84 so as to provide their access to the broiler.

Figure 5:
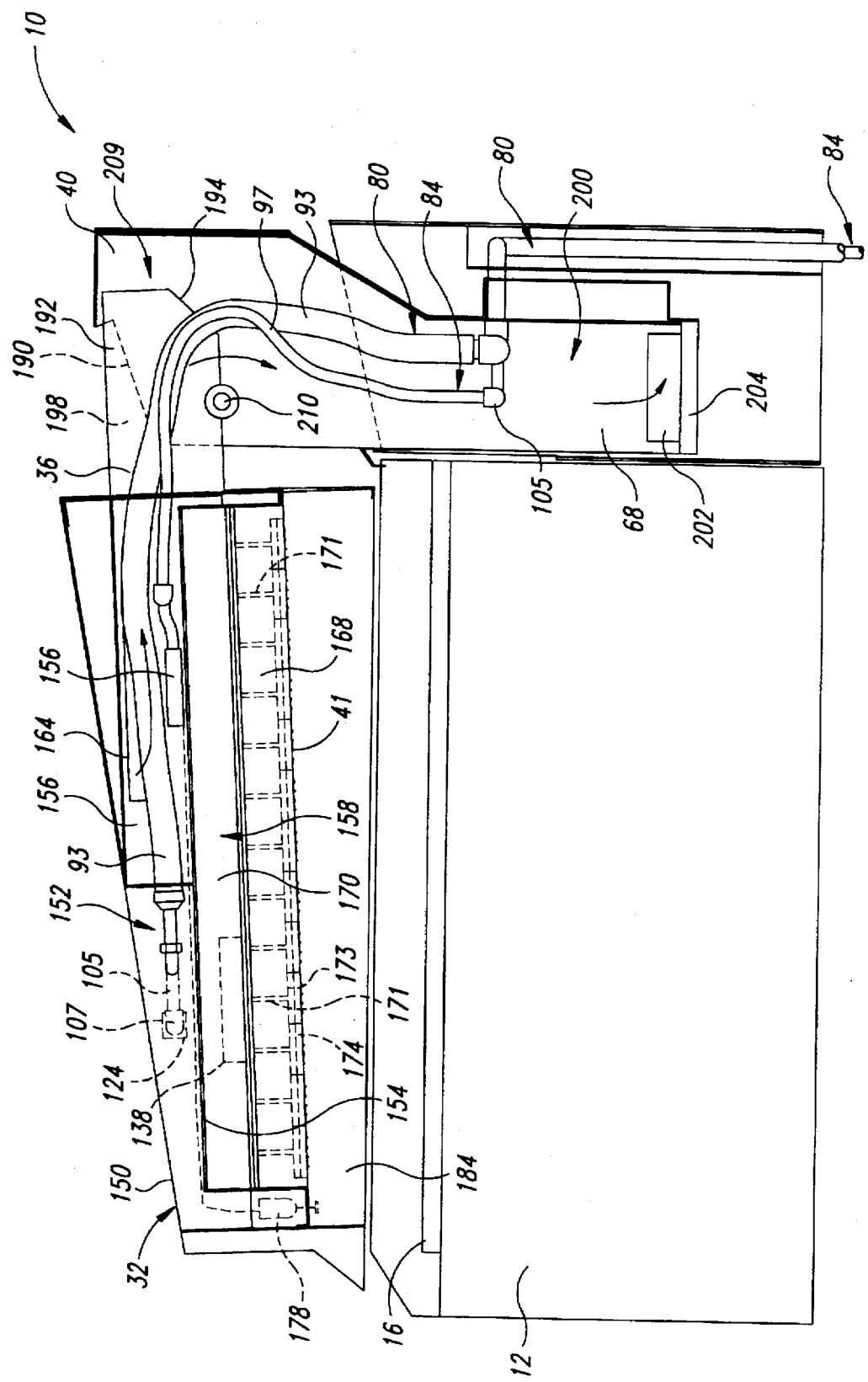
FIG. 5 is an enlarged cross-sectional right side view taken substantially along line 5—5 of FIG. 2 illustrating interior passageways in a broiler, a right stanchion, and a right support arm.

As best seen in FIGS. 4 and 5, the flexible upper hose portion 93 of the gas line 80 extends upwardly from its pass-through fitting 105 through the right stanchion 40. The upper hose portion 93 bends forwardly and extends out of the top of the right stanchion 40 into the right support arm 36. The flexible upper electrical conduit portion 97 of the electrical line 84 extends upwardly from its pass-through fitting 105 through the right stanchion 40 adjacent to the upper hose portion 93. The upper conduit portion 97 also bends forwardly and extends out of the top of the right stanchion 40 into the right support arm 36. Each of the upper hose portion 93 and upper electrical conduit portion 97 are sufficiently flexible to allow it to bend and extend into the right support arm 36 without bending in a radius that is less than the minimum bend radius, thereby ensuring the elastic limit of the upper hose portion and upper electrical conduit portion is not exceeded. Accordingly, fatigue in the upper hose portion 93 and the upper electrical conduit portion 97 is minimized and a constant gas flow through the flexible upper hose portion 93 is maintained without a significant pressure drop in the gas line 80 between the lower fitting 92 and an upper end of the gas line.

The upper hose portion 93 and the upper conduit portion 97 allow the broiler 32 and the left and right support arms 34 and 36 to pivot between the raised, open position and the lowered, cooking position without excessive bending of either the upper hose portion or the upper conduit portion. Accordingly, the need for a sealed swivel joint in the gas line 80, in an area where the right support arm 36 pivots relative to the right stanchion 40 is alleviated.

Figure 6:
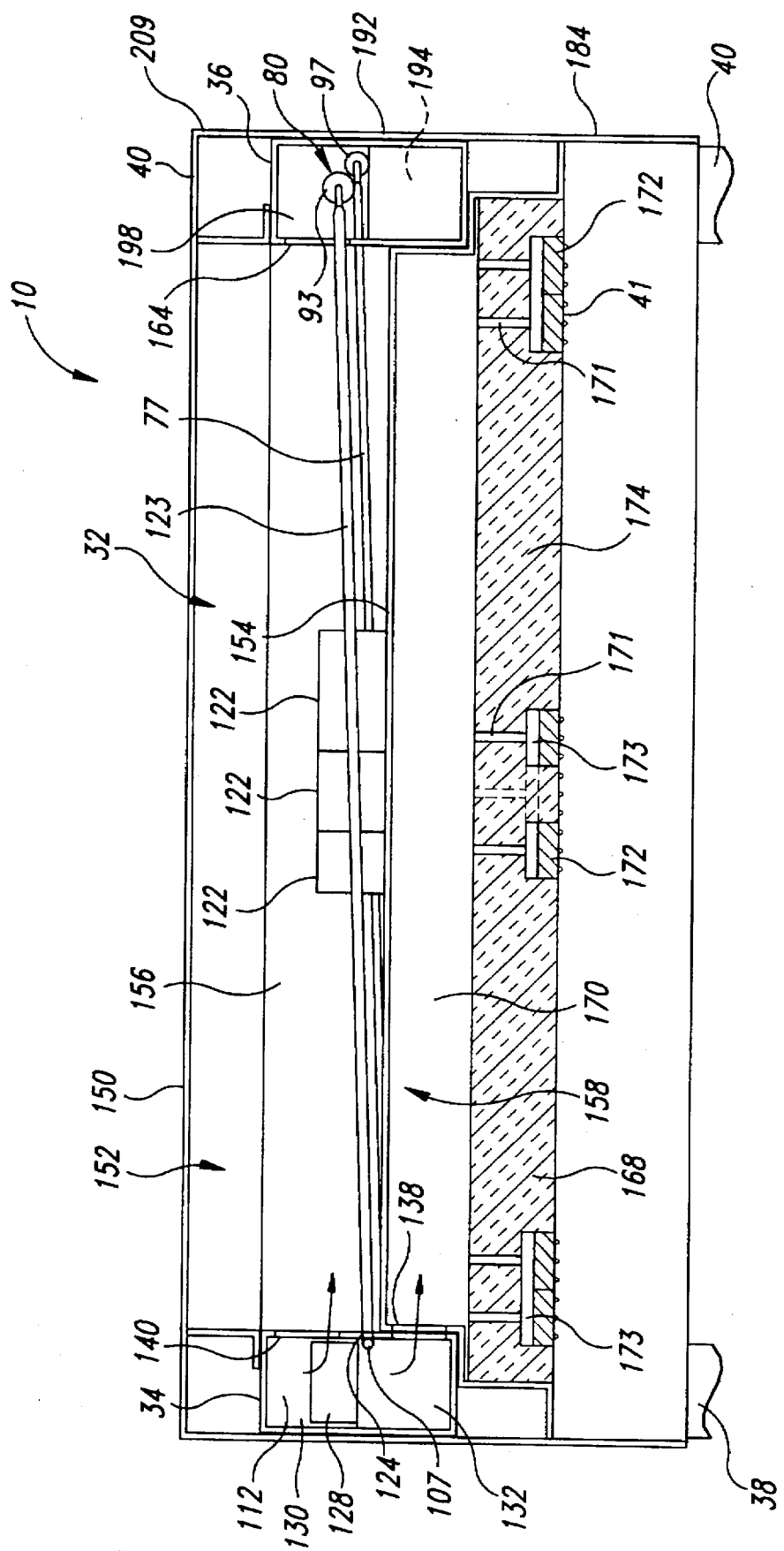
FIG. 6 is an enlarged cross-sectional front view taken substantially along line 6—6 of FIG. 1 illustrating interior air passageways within the broiler and left and right support arms.

As best seen in FIG. 6, the upper conduit portion 97 terminates in the right support arm 36 adjacent to the broiler 32. A plurality of shielded wires 77 of the electrical line 84 extend into the broiler 32 and operatively connects to electrical components 122 contained within the broiler. In the preferred embodiment, the electrical components 122 include a spark module, a solenoid valve, a tilt switch, and a timer relay. The upper hose portion 93 of the gas line 80 also terminates in the right support arm 36, and upper hose portion is connected to a rigid pipe portion 123 that extends across of the broiler 32 to a left side thereof. The rigid pipe portion 123 terminates at a gas discharge nozzle 107, which extends through a gas inlet orifice 124 in the left support arm 34.

Figure 7:
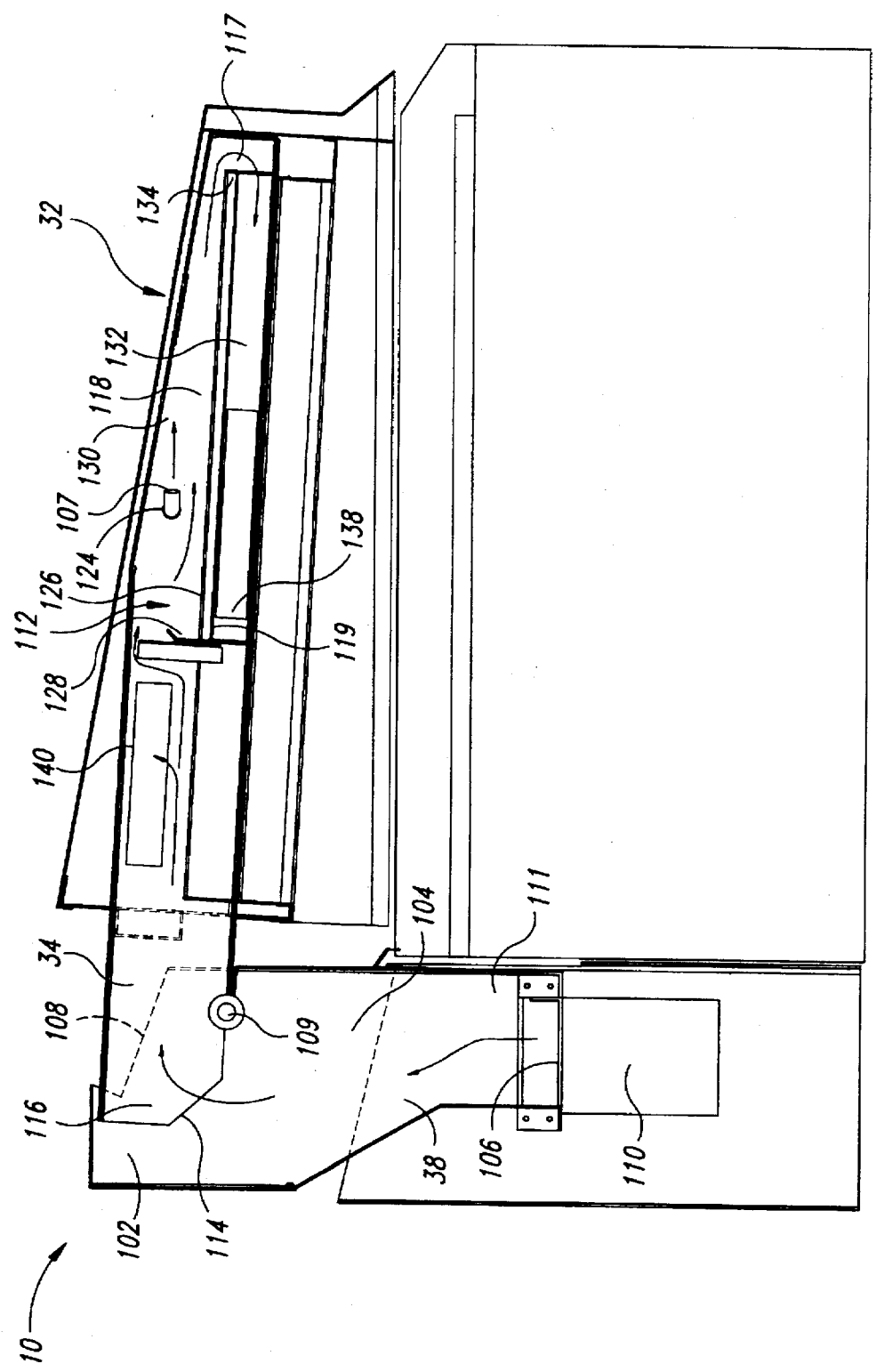
FIG. 7 is an enlarged cross-sectional left side view taken substantially along line 7—7 of FIG. 1 illustrating interior air passageways within a left stanchion and a left support arm.

Before gas from the gas line 80 is delivered to the broiler 32 for ignition, the gas must be mixed with combustion air. As indicated above, the combustion air is provided through the left stanchion 38 and left support arm 34. As best seen in FIG. 7, the left stanchion 38 has an upper portion 102 with an upper air outlet 108 formed therein, and a lower portion 111 with a lower air inlet 106 formed therein. In the preferred embodiment, the generally hollow left stanchion 38 defines a lower combustion air passageway 104 extending between the lower air inlet 106 and the upper air outlet 108. A blower 110 is securely mounted to the lower portion 111 of the left stanchion 38 and is positioned to blow combustion air into the left stanchion through the lower air inlet 106 and upwardly through the lower air passageway 104 to the upper air outlet 108.

The upper air outlet 108 is shaped and positioned to communicate with an upper combustion air passageway 112 in the generally hollow left support arm 34. The upper air passageway 112 extends forwardly from an upper air inlet 114 in a rear end portion 116 of the left support arm 34 to a forward end portion 118. The upper air inlet 114 communicates with the upper air outlet 108 in the left stanchion 38 such that the combustion air flowing through the lower air passageway 104 by the blower 110 is directed through the upper air inlet and into the upper air passageway 112.

In the preferred embodiment, the rear end portion 116 of the left support arm 34 extends into and is sealably engaged with the upper portion 102 of the left stanchion 38. The left support arm 34 is pivotally connected to the left stanchion 38 by a left pivot pin 109 that extends through the left stanchion's upper portion 102. The left support arm's rear end portion 116 and the left stanchion's upper portion 102 define a sliding duct hinge that is substantially sealed when the broiler 32 is in the lowered, cooking position and the raised, open position. Accordingly, substantially all of the combustion air from the blower 110 is directed into the left support arm 34 when the broiler 32 is in either the lowered, cooking position or the raised open position.

The left support arm 34 has an air flow divider 126 mounted within the forward end portion 118 of the upper air passageway 112. The air flow divider 126 divides the forward end portion 118 into an upper channel 130 and a lower channel 132, which are interconnected only at a forward end 117 to allow air to flow between the upper and lower channels. The air flow divider 126 of the preferred embodiment is an aluminum member that is welded in place or otherwise securely fastened within the upper air passageway 112.

An adjustable air metering dam 128 is positioned at a rearward end 119 of the air flow divider 126 adjacent to a rear opening of the upper channel 130. The air metering dam 128 adjustably extends across a selected lower portion of the rear opening of the upper channel 130 to control the volume of combustion air that flows into the upper channel. The air metering dam 128 completely covers and seals a rear end of the lower channel 132. Accordingly, combustion air must first pass over the air metering dam 128, through the upper channel 130, and to the forward end 117 thereof before entering the lower channel 132. Once the combustion air enters the lower channel 132, the air is directed rearwardly toward the sealed rearward end of the lower channel where it is then directed into the broiler 32.

As noted above, the gas discharge nozzle 107 that delivers the gas from the gas source 82 extends through the gas inlet orifice 124 in the left support arm 34. It then extends into the upper channel 130 at a location forward of the air metering dam 128. The gas discharge nozzle 107 directs a selected amount of gas into the flow of combustion air in the upper channel 130 so that the gas and air will mix as they move through the upper and lower channels 130 and 132 to achieve a selected air and gas mixture for the broiler 32. The lower channel 132 of the left support arm 34 has an air and gas mixture outlet 138 at a rearward end of the lower channel that communicates with the broiler 32 such that the gas and air mixture is provided from the mixture outlet into the broiler. Accordingly, the upper and lower channels 130 and 132 in the left support arm 34 act as a mixing chamber for the gas and air before the mixture is directed into the broiler 32 for combustion.

The left support arm 34 includes an upper air outlet 140 that is located rearward of the air metering dam 128 and that communicates with the upper air passageway 112 to cause a portion of the air that enters the upper air passageway to not pass over the air metering dam 128 into the upper channel 130. Instead, this portion of the air is directed into the broiler 32 for cooling the electrical components 122 therein, as will be described below. Accordingly, a portion of the air supplied by the blower 110 through the left stanchion 38 is used for cooling the electrical components 122, and the remaining portion is used for mixing with the gas in the upper and lower channels 130 and 132.

As best seen in FIGS. 5 and 6, the broiler 32 has a broiler housing 150 that is securely attached to the left and right support arms 34 and 36. The broiler housing 150 defines a broiler interior area 152. The broiler 32 has an upper plenum member 154 that forms a divider within the broiler interior area 152 that serves as a metal plate divider wall which is securely attached to the broiler housing 150. The upper plenum member 154 divides the broiler interior area 152 into an upper portion 156 that is above the upper plenum member and a lower portion 158 that is below the upper plenum member. The electrical components 122 of the broiler 32 are mounted in the upper portion 156 of the broiler's interior area 152. In the preferred embodiment, the upper plenum member 154 completely separates the upper and lower portions 156 and 158 of the broiler interior area 152 such that there is substantially no air flow between the upper and lower portions.

The upper portion 156 of the broiler interior area 152 communicates with the upper air outlet 140 in the left support arm 34 and receives the cooling air portion of the air passing through the upper air passageway 112. The air flowing through the upper portion 156 of the broiler's interior area 152 flows over and around the electrical components 122, thereby carrying heat away from the components and cooling them. The cooling air, having passed by the electrical components 122, is exhausted through an upper exhaust inlet 164 located in the right support arm 36 at the right side of the upper portion 156 of broiler interior area 152. The generally hollow right support arm 36 defines an upper exhaust passageway 198 that extends between the upper exhaust inlet 164 and an upper exhaust outlet 194 in a rear end portion 192 of the right support arm. The upper exhaust passageway 198 is shaped and sized to receive and carry the exhausted cooling air away from the upper portion 156 of the broiler interior area 152. The flexible upper hose portion 93 and the flexible upper conduit portion 97 that extend forwardly from the right stanchion 40, as discussed above, extend through the upper exhaust passageway 198.

As best seen in FIG. 5, the rear end portion 192 of the right support arm 36 sealably extends into the right stanchion 40 through an upper exhaust inlet 190 in an upper portion 209 of the right stanchion. The right support arm 36 is pivotally connected to the right stanchion 40 by a right pivot pin 210 that extends through the right stanchion's upper portion 209, in coaxial alignment with the left pivot pin 109 pivotally connecting the left support arm 34 to the left stanchion 38. The right support arm's rear end portion 192 and the right stanchion's upper portion 209 define a sliding duct hinge that is substantially sealed when the broiler 32 is in the lowered, cooking position and in the raised, open position. In an alternate embodiment, seals are mounted at the interconnection between the left stanchion 38 and left support arm 34, and between the right stanchion 40 and right support arm 36 so each sliding duct hinge remains sealed when the broiler 32 is moved between the lowered, cooking position and the raised, open position.

The generally hollow right stanchion 40 defines a lower exhaust passageway 200 that extends between the upper exhaust inlet 190 and a lower exhaust outlet 202 in the right stanchion's lower portion 68. As best seen in FIGS. 3 and 5, the lower exhaust outlet 202 is located below the position where the gas and electrical lines 80 and 84 enter the right stanchion 40. In the preferred embodiment, the gas and electrical lines 80 and 84 extend upwardly through the right stanchion 40 along the lower exhaust passageway 200 such that the lower exhaust passageway also serves as the gas hose and electrical conduit raceway.

As best seen in FIG. 2, the lower exhaust outlet 202 (shown in hidden lines) directs the exhausted cooling air inwardly into the housing interior area 50 toward the left stanchion 38. A lower component tray 204 (see FIG. 2) extends between the left and right stanchions 38 and 40, and a plurality of lower electrical components 206, shown in hidden lines, are mounted on the lower component tray substantially adjacent to the lower exhaust outlet 202. The lower electrical components 206 include a conventional transformer and a blower air switch. The exhausted cooling air passing from the lower exhaust outlet 202 is directed over and around the lower electrical components 206 to cool the lower electrical components 206 during operation of the conversion broiler assembly 10.

Returning now to the broiler 32 illustrated in FIGS. 5 and 6, the broiler has a lower plenum member 168 positioned in the lower portion 158 of the broiler interior area 152. The lower plenum member 168 is spaced apart from and below the upper plenum member 154 and is securely attached to the broiler housing 150 to define a plenum 170 between the upper and lower plenum members. The plenum 170 communicates with the upper mixture outlet 138 of the lower channel 132 in the left support arm 34 such that the air and gas mixture from the lower channel flows into the plenum. The flow of the air and gas mixture is such that the mixture in the plenum 170 is at a selected substantially constant pressure.

In the preferred embodiment, the lower plenum member 168 is a ceramic unit having a tile retaining channel 173 formed in its lower side 174. The tile retaining channel 173 securely holds a plurality of burner tiles 172 in a selected orientation and pattern. The burner tiles 172 and the lower side 174 of the ceramic lower plenum member 168 define the broiling surface 41 that is spaced above the cooking surface 16 of the griddle 12 (FIG. 5) when the broiler 32 is in the lowered, cooking position, so as to provide even and controlled broiling heat.

The ceramic lower plenum member 168 has a plurality of apertures 171 extending therethrough that communicate with the plenum 170 and with the tile retaining channel 173 at locations above the burner tiles 172 to evenly distribute the gas and air mixture in the plenum to all of the burner tiles. The burner tiles 172 also have apertures extending therethrough that allow the gas and air mixture to pass from the tile retaining channel 173 to the broiler surface 41. After the gas and air mixture has passed through the burner tiles 172, the mixture is ignited by a conventional spark module electrode assembly 178 that is mounted at a forward portion of the broiler interior area 152 adjacent to the forward edge of the lower plenum member 168. Accordingly, the ignited mixture of gas and air provides the broiling heat.

In the preferred embodiment, the ceramic lower plenum member 168 is a single integral ceramic member that defines a bottom surface of the plenum 170 within the broiler 32 and that also serves as the tile holder to securely retain the burner tiles 172 along the tile retaining channel 173. The preferred ceramic material has advantageous insulative characteristics that minimizes thermal stresses and heat transfer within the burner housing 150, so the temperature of the ceramic forming an upper surface of the lower plenum member 168 does not get too high. While the ceramic lower plenum member 168 is used in the preferred embodiment, alternate embodiments may have lower plenum members constructed of other material, such as a metal that can withstand high broiling temperatures.

Figure 9:
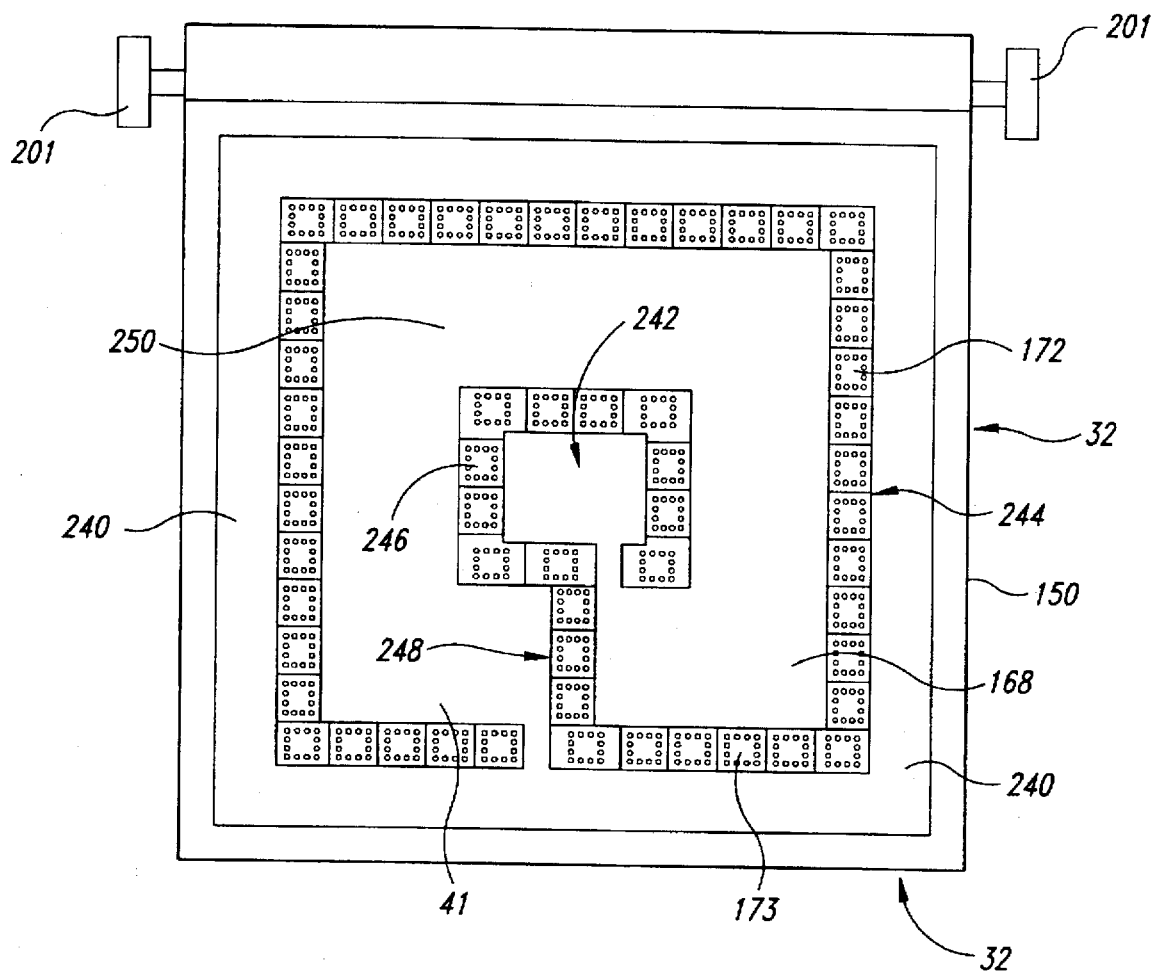
FIG. 9 is an enlarged bottom plan view of the broiler showing a burner tile pattern.

As best seen in FIGS. 1 and 9, the ceramic lower plenum member 168 securely holds the burner tiles 172 in a selected pattern to provide uniform heat distribution. The lower plenum member 168 of the preferred embodiment has a generally square shape with four side portions 240 that extend around a central portion 242. A plurality of the burner tiles 172 are mounted to the ceramic lower plenum member 168 along the four side portions 240, inward from the edges of the ceramic lower plenum member, to provide a perimeter set 244 of burner tiles with a generally square arrangement. A plurality of the burner tiles 172 are mounted to the lower plenum member 168 at the central portion 242 to provide a small central set 246 of burner tiles with a generally square arrangement positioned inward of and spaced apart from the perimeter set. The burner tiles 172 forming the corresponding four sides of each generally square set are in parallel alignment. A plurality of the burner tiles 172 extend between the perimeter set 244 and the central set 246 of burner tiles to form an interconnection set 248 of burner tiles. The interconnection set 248 is aligned parallel to and spaced equally between the burner tiles forming two of the parallel sides of each of the square sets.

In the preferred embodiment, the burner tiles 172 form a continuous line of tiles that are positioned to provide the outer perimeter set 244, the smaller central set 246 and the interconnecting set 248 of burner tiles. The preferred pattern formed by the burner tiles 172 provides an improved broiler heating pattern because the outer perimeter set 244 of burner tiles 172 is separated from the central set 246 by intermediate portions 250 of the ceramic lower plenum member 168, and these intermediate portions radiate substantially no heat. Accordingly, the pattern of burner tiles 172 held by the ceramic lower plenum member 168 results in a very even heat distribution across the bottom surface 41 of the broiler 32 when it is activated.

Although the illustrated embodiment has the outer perimeter set 244 of burner files 172 in a generally square shape and the inner smaller central set 246 also in a generally square shape, other burner tile patterns may be used in alternate embodiments so as to provide a heat radiation source around an outer perimeter area that provides a large area of heat radiation therearound and a smaller central radiation area source such that even heating is accomplished across the bottom surface 41.

As best seen in FIG. 5, the broiler housing 150 of the preferred embodiment has outer edge portions 184 that extend downwardly past the ceramic lower plenum member 168. The outer edge portions 184 provide outer guard portions that direct the heat from the broiler bottom surface 41 downwardly toward the griddle cooking surface 16 when the broiler 32 is in the lowered, cooking position. As best seen in FIG. 1, the from of the broiler 32 also has a pair of handles 201 on opposite sides of the broiler housing 150. The handles 201 are positioned so they remain cool and usable while the broiler 32 is in use, thereby allowing a user to pivot the broiler between the lowered, cooking position and the raised, open position, and to move the broiler laterally.

Referring again to FIG. 5, the ceramic lower plenum member 168 is mounted to the broiler housing 150 at an angle so that the broiler bottom surface 41 slopes upwardly and rearwardly when the broiler 32 is in the lowered, cooking position. The sloped broiler bottom surface 41 is positioned to direct broiler combustion exhaust and cooking fumes, which are generated below the broiler surface, rearwardly toward the area between the left and right stanchions 34 and 36.

Figure 8:
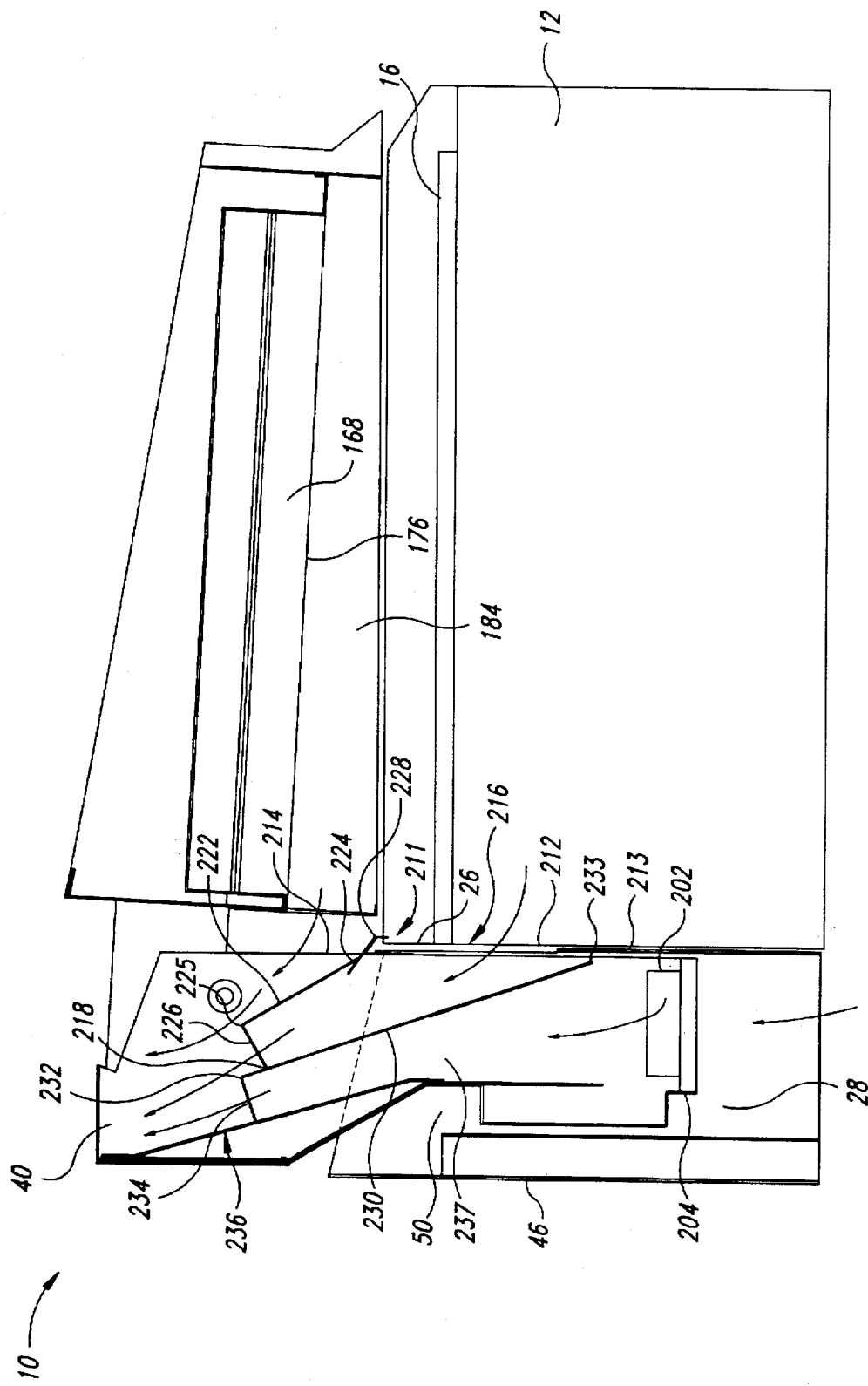
FIG. 8 is an enlarged cross-sectional left side view taken substantially along line 8—8 of FIG. 1 illustrating an exhaust flue system and exhaust and air passageways, without the components of the rail system and broiler being shown for purposes of clarity.

As best seen in FIG. 8, the conventional griddle 12 has the cooking surface 16 above a griddle exhaust aperture 212 in a rear wall 213 of the griddle. The griddle exhaust aperture 212 is positioned and sized to receive griddle exhaust generated from the heating of the griddle's cooking surface. The griddle exhaust aperture 212 directs the griddle exhaust rearwardly away from the griddle 12 toward the housing interior area 50 of the rear housing 28 when the conversion broiler assembly 10 is mounted to the griddle. When the broiler 32 is activated in the lowered, cooking position, the broiler exhaust is generated between the broiler bottom surface 41 and the griddle's cooking surface 16. During a cooking procedure with the broiler 32 and the griddle 12 being activated, the broiler exhaust and the griddle exhaust have temperatures in the range of 800°–1200° F.

The conversion broiler assembly 10 controls the flow of high temperature griddle and broiler exhausts with a flue system 218 mounted within a cooker exhaust receiving area 211 (see FIG. 2) within the rear housing between the left and right stanchions 38 and 40. The flue system 218 is attached to and moves with the left and right stanchions 38 and 40 as the broiler 32 is moved laterally. The flue system 218 is adapted to direct the broiler exhaust, the griddle exhaust, and also the exhausted cooling air exiting the right stanchion 40 upwardly away from conversion broiler assembly 10, for example toward a conventional fan or hood that is typically placed above a griddle. The flue system 218 is adapted to effectively channel exhaust gases upwardly away from the conversion broiler assembly 10 regardless of the lateral position of the broiler 32 relative to the griddle 12.

As shown in FIG. 8, the flue system 218 includes a broiler flue 222 formed by a generally flat metal plate having a forward lower edge 224 adjacent to the rear splash guard 26 of the griddle 12. The forward lower edge 224 is positioned above and rearward of the griddle's rear splash guard 26 when the broiler conversion assembly 10 is mounted to the griddle 12. The broiler flue 222 is sloped upwardly and rearwardly from the forward, lower edge 224 to a rearward, upper edge 225. Support brackets 226 are connected to the broiler flue's rearward upper edge 225, to securely attach the broiler flue 222 to the left and right stanchions 38 and 40.

A drip guard 228 is positioned below the forward lower edge 224 of the broiler flue 222 such that the broiler flue slightly overlaps the drip guard. The drip guard 228 slopes downwardly and forwardly, and extends over the rear splash guard 26 of the griddle 12. The drip guard 228 and the broiler flue 222 extend laterally across the cooker exhaust opening 211 and divide the cooker exhaust receiving area into an upper broiler exhaust receiving passageway 214 and a lower griddle exhaust receiving passageway 216 below the upper broiler exhaust receiving passageway and aligned with the griddle exhaust aperture 212 to receive exhaust therefrom.

The upper broiler and lower griddle exhaust receiving passageways 214 and 216 are defined on the left and right by the left and right stanchions 38 and 40. The upper broiler exhaust receiving passageway 214 is further defined by a rear surface of the broiler 32. The broiler flue 222 and the drip guard 228 are shaped and positioned to direct the broiler exhaust upwardly and rearwardly through the upper broiler exhaust receiving passageway 214 in a layer of broiler exhaust relative to the rear housing 28. The drip guard 228 is also positioned to direct any condensation or drippings from the broiler flue 222 onto the griddle's cooking surface 16.

A griddle flue 230 is spaced below and rearward from the broiler flue 222 and defines a lower side of the lower griddle exhaust receiving passageway 216. The griddle flue 230 is a flat metal plate sloped upwardly and rearwardly from a forward, lower edge 233 adjacent to and below the griddle exhaust aperture 212. The griddle flue 230 terminates at a rearward, upper edge 232 that is spaced apart from the broiler flue's rearward upper edge 225 to define a top opening of the griddle exhaust receiving passageway 216. The griddle flue 230 is securely mounted to the left and right stanchions 38 and 40 by support brackets 234. The griddle flue 230 is shaped and sized to direct the griddle exhaust from the griddle exhaust aperture 212 through the lower griddle exhaust receiving passageway 216 and out the top opening upwardly and rearwardly in a layer of griddle exhaust, such that the layer of griddle exhaust is rearwardly adjacent to the high temperature layer of broiler exhaust. The top opening of the griddle exhaust receiving passageway 216 is shaped to maintain a substantially laminar flow of the griddle exhaust when it exits the griddle exhaust receiving passageway.

The flue system 218 also includes a back flue 236 spaced rearwardly apart from the griddle flue 230. The back flue 236 slopes rearwardly and upwardly from a position forwardly adjacent to the top of the hose-and-conduit housing 88 to the upper, rearward corner of the left and right stanchions 38 and 40. Accordingly, the back flue 236 defines an exhausted cooling air passageway 237 between the griddle flue 230 and the back flue 236 that communicates with the lower exhaust outlet 202 in the right stanchion 40. The flow of exhausted cooling air exiting the right stanchion 40 as discussed above first cools the lower electrical components 206 in the housing interior area 50 and then is directed into the exhaust air passageway 237. The exhausted cooling air moves upwardly through a top opening of the exhausted cooling air passageway 237 between the griddle flue 230 and the back flue 236. The top opening of the exhausted cooling air passageway 237 is shaped to maintain a substantially laminer flow of the exhausted cooling air when it exits the exhausted cooling air passageway.

The exhausted cooling air is directed upwardly along the back flue 236 forming a barrier layer of wash air between the back flue 236 and the layer of griddle exhaust from the lower griddle exhaust receiving passageway 216. The barrier layer of wash air has a significantly lower temperature than the layer of griddle exhaust, and is located between the higher temperature layer of griddle exhaust and the back flue 236 to provide an insulating layer of air between the higher temperature layers of griddle exhaust and broiler exhaust. As a result, the back flue 236 remains relatively cool during operation of the broiler 32 and the griddle 12.

The back flue 236 is positioned apart from and forward of the rear wall 46 of the rear housing 28 by a selected distance, thereby forming a double-walled structure at the rear of the conversion broiler assembly 10 with an air gap therebetween. As a result, the rear wall 46 of the rear housing 28 is effectively insulated from the high temperature broiler and griddle exhausts, and the rear wall remains cool to the touch while the broiler 32 and the griddle are cooking. When the conversion broiler assembly 10 is mounted onto the griddle 12 or other single-sided cooking apparatus, the entire combination can be positioned in a room with the rear wall 46 of the rear housing 28 immediately against or adjacent to a wall of the room with danger of fire. With such zero-clearance placement possible, the conversion broiler assembly 10 sized to be attached to a conventional griddle, charbroiler, or other cooker can be located within the existing space previously required for the conventional cooker and the space behind the cooker required for clearance from the wall. Accordingly, the conversion broiler assembly 10 does not require additional space to be installed safely on a conventional cooker.

Numerous modifications and variations of the conversion broiler assembly disclosed herein will occur to those skilled in the art in view of this disclosure. Therefore, it is to be understood that such modifications and variations may be practiced while remaining within the spirit and the scope of the invention as defined in the following claims.

We claim:

1. A conversion broiler assembly to adapt a single-sided cooking apparatus to a double-sided cooking apparatus, the single-sided cooking apparatus having an upwardly facing cooking surface with front and rear edge portions, and being useable to create a cooker exhaust, the conversion broiler assembly comprising:

a rear housing mountable to the cooking apparatus at the rear edge portion thereof, the rear housing having opposing first and second laterally spaced apart sidewalls and a rear wall extending between the first and second sidewalls and positioned to be spaced apart from the rear edge portion of the cooking apparatus, and the rear wall defining with the first and second sidewalls a first interior area positioned to receive the cooker exhaust from the cooking apparatus;

first and second broiler support members connected to the rear housing and laterally spaced apart from each other;

a broiler attached to the first and second broiler support members, the broiler being pivotally movable relative to the rear housing between a lowered, cooking position over the cooking surface of the cooking apparatus when the conversion broiler assembly is mounted to the cooking apparatus and a raised, open position, the broiler having a heatable broiler surface positionable above the cooking surface when the broiler is in the lowered, cooking position, the broiler and the first and second broiler support members defining a broiler exhaust opening adjacent to the broiler and between the first and second broiler support members, the broiling surface being useable to create a broiler exhaust and the first interior area being positioned to receive the broiler exhaust from the broiler; and an exhaust separator extending between the first and second broiler support members and across the first interior area, the exhaust separator dividing the first interior area into a first exhaust passageway having a first exhaust opening positioned to receive the broiler exhaust and a second exhaust passageway having a second exhaust opening positioned to receive the cooker exhaust, the exhaust separator being shaped and sized to direct the broiler exhaust upwardly through the first exhaust passageway and form a first layer and the cooker exhaust upwardly through the second exhaust passageway and form a second layer with the second layer of cooker exhaust being positioned between the rear wall and the first layer of broiler exhaust.

2. A conversion broiler assembly to adapt a single-sided cooking apparatus to a double-sided cooking apparatus, the single-sided cooking apparatus having an upwardly facing cooking surface and being connectable to a gas source, the conversion broiler assembly comprising:

a rear housing mountable to the cooking apparatus and shaped to define a first interior area adjacent to the cooking apparatus;

a gas line coupled to the gas source to carry gas therethrough, the gas line terminating at a discharge end;

first and second stanchions attached to the rear housing and laterally spaced apart from each other, the first stanchion having a first air inlet and a first air outlet spaced apart from each other and a first air supply passageway extending therebetween, the first air supply passageway being sized to allow sufficient air flow for combustion and cooling to flow therethrough, the second stanchion having a first exhausted cooling air inlet and a first exhausted cooling air outlet spaced apart from each other and a first exhausted cooling air passageway extending therebetween, the first exhausted cooling air passageway being sized to allow exhausted cooling air to flow therethrough;

a first support arm connected to the first stanchion, the first support arm having a second air supply passageway therein with a second air inlet that communicates with the first air inlet in the first stanchion to allow the air to flow from the first air supply passageway into the second air supply passageway, the second air supply passageway having a first passageway portion with a second air outlet and a second passageway portion with a third air outlet, the first support arm having a gas entry aperture that communicates with the second passageway portion of the second air supply passageway, the gas entry aperture receiving the discharge end of the gas line to direct the gas into the second passageway portion for mixing with combustion air within the second passageway portion to provide a selected gas and air mixture at the third air outlet;

a second support arm connected to the second stanchion, the second support arm having a second exhausted cooling air passageway therein with a second exhausted cooling air inlet and a second exhausted cooling air outlet spaced apart from each other with the second exhausted cooling air passageway extending therebetween, the second exhausted cooling air outlet communicating with the first exhausted cooling air inlet in the second stanchion to interconnect the first and second exhausted cooling air passageways together; and a broiler connected to the first and second support arms and being movable relative to the first and second stanchions between a lowered, cooking position and a raised, open position, the broiler having a broiler housing with a broiler interior area, the broiler housing extending between the first and second support arms and having upper and lower plenum members in the broiler interior area, the lower plenum member defining a broiler surface, the upper plenum member dividing the broiler interior area into upper and lower portions, the upper and lower plenum members being spaced apart from each other to define a plenum therebetween, the broiler having at least one electrical component positioned in the upper portion of the broiler interior area, the upper portion of the broiler interior area communicating with the second air outlet of the first passageway portion of the second air supply passageway in the first support arm to receive a flow of cooling air from the first passageway portion to cool the electrical component in the upper portion of the broiler interior area, the upper portion of the broiler interior area communicating with the second exhausted cooling air inlet of the second exhausted cooling air passageway in the second support arm to allow the flow of cooling air to exit from the upper portion of the broiler interior area and enter as exhausted cooling air into the second exhausted cooling air passageway, the plenum communicating with the third air outlet of the second passageway portion of the second air supply passageway in the first support arm to receive a flow of the selected gas and air mixture therefrom, the plenum being positioned to communicate with the broiler surface to provide the selected air and gas mixture thereto for ignition.

3. The conversion broiler assembly of claim 2 wherein the first support arm has a divider plate therein dividing the second air supply passageway into the first and second passageway portions that are interconnected, the divider being positioned to direct the air flow from the first air supply passageway past the second air outlet and into the first passageway portion of the second air supply passageway so a portion of the air flows through the second air outlet and a portion of the air flows through the first passageway portion and the second passageway portion to the third air outlet.

4. The conversion broiler assembly of claim 3 wherein the gas entry aperture in the first support arm communicates with the first passageway portion of the second air supply passageway and the discharge end of the gas line is positioned to direct gas into the first passageway portion, and the third air outlet directly communicates with the second passageway portion.

5. The conversion broiler assembly of claim 3 wherein the first and second channels define a mixing chamber within the first support arm for mixing of the gas and air therein before the gas and air mixture flows through the third air outlet and enters the plenum.

6. The conversion broiler assembly of claim 2 further comprising a blower attached to the first stanchion and positioned to provide a flow of air into the first air supply passageway through the first air inlet.

7. The conversion broiler assembly of claim 2 wherein the second air outlet in the first support arm is between the gas entry aperture and the second air inlet.

8. The conversion broiler assembly of claim 2 further comprising an airflow adjusting apparatus attached to the first support arm in the second air supply passageway and positioned to adjustably control an amount of air flowing through the second air supply passageway.

9. The conversion broiler assembly of claim 2 wherein the first and second support arms are pivotally connected to the first and second stanchions respectively for movement of the broiler between the raised, open position and the lowered, cooking position.

10. The conversion broiler assembly of claim 2 wherein the first and second stanchions are laterally movable as a unit relative to the rear housing for lateral adjustability of the broiler relative to the rear housing and to the cooking surface of the cooking apparatus when the conversion broiler assembly is mounted to the cooking apparatus.

11. The conversion broiler assembly of claim 10 further comprising a gas line housing mounted to the rear wall of the rear housing to define a gas line travel area containing a portion of the gas line therein, the gas line travel area being sized to allow the portion of the gas line to move therein relative to the rear wall of the rear housing when the first and second stanchions are moved laterally.

12. The conversion broiler assembly of claim 11, wherein the gas line housing has an elongated travel slot therein, and the gas line extends through the travel slot.

13. The conversion broiler assembly of claim 11 wherein the gas line has a flexible hose portion having a minimum bend radius, the flexible hose portion extends through one of the first and second stanchions and through one of the first and second support arms and bends therein with a bend radius that is greater than the minimum bend radius when the broiler is moved between the raised, open position and the lowered, cooking position.

14. A conversion broiler assembly to adapt a single-sided cooking apparatus to a double-sided cooking apparatus, the single-sided cooking apparatus having an upwardly facing cooking surface extending between the opposing from and back sides, the single-sided cooking apparatus being adapted to create a cooker exhaust, comprising:

a rear housing mountable to the cooking apparatus, the rear housing having opposing first and second sidewalls shaped to be fastened to the cooking apparatus and a rear wall extending between the first and second sidewalls and positioned to be spaced apart from the back side of the cooking apparatus, the rear wall and first and second sidewalls defining a first interior area;

first and second broiler support members connected to the rear housing and spaced apart from each other, the first broiler support member having a cooling air passageway extending therethrough; and a broiler attached to the first and second broiler support members, the broiler being movable relative to the rear housing between a lowered, cooking position over the cooking surface of the cooking apparatus when the conversion broiler assembly is mounted to the cooking apparatus and a raised, open position, the broiler having a heatable broiler surface positionable above the cooking surface and facing the cooking surface when the broiler is in the lowered, cooking position, the broiler having a broiler housing extending between the first and second broiler support members and having a broiler interior area and a plenum member in the broiler interior area, the plenum member dividing the broiler interior area into upper and lower portions, the broiler having at least one electrical component positioned in the upper portion of the broiler interior area, the upper portion of the broiler interior area communicating with the cooling air passageway in the first broiler support member to receive a flow of cooling air from the cooling air passageway to cool the electrical component.

15. A conversion broiler assembly to adapt a single-sided cooking apparatus to a double-sided cooking apparatus, the single-sided cooking apparatus having opposing front and back sides, an upwardly facing cooking surface extending between the opposing front and back sides, and being connectable to a gas source, the cooking surface having front and rear edge portions, the conversion broiler assembly comprising:

a rear housing mountable to the cooking apparatus;

first and second stanchions attached to the rear housing and laterally spaced apart from each other, the first stanchion having a first bottom portion, a first top portion, and a first air supply passageway extending therebetween and terminating at a first air inlet and a first air outlet, the second stanchion having a second bottom end, a second top end, and a first exhausted cooling air passageway extending therebetween and terminating at a first exhausted cooling air inlet and a first exhausted cooling air outlet;

a first support arm connected to the first top portion of the first stanchion, the first support arm having a first rearward end portion, a first forward end portion, and a second air supply passageway extending therebetween, the first support arm having a second air inlet that communicates with the first air outlet to allow sufficient air flow for combustion and cooling to pass through the first air supply passageway into the second air supply passageway, the second air supply passageway having a first passageway portion with a second air outlet and a second passageway portion with a third air outlet, the first support arm having a gas entry aperture therein that communicates with the second passageway portion of the second air supply passageway, the gas entry aperture being coupled to the gas source and being positioned away from the second and third air outlets so gas from the gas source is directed through the gas entry aperture into the second passageway portion of the second air passageway to mix with combustion air within the second passageway portion to provide a selected gas and air mixture at the third air outlet;

a second support arm connected to the second top portion of the second stanchion, the second support arm having a second rearward end portion, a second forward portion, a second exhausted cooling air inlet and a second exhausted cooling air outlet spaced apart from each other, and a second exhausted cooling air passageway extending therebetween, the second exhausted cooling air outlet communicating with the first exhausted cooling air inlet in the second stanchion so the first and second exhausted cooling air passageways are interconnected to provide an exhaust path through the second support arm and the second stanchion;

a broiler connected to the first and second support arms and being movable relative to the first and second stanchions between a lowered position and a raised position, the broiler having a broiler housing connected to the first and second support arms, an upper plenum member mounted to the broiler housing, a lower plenum member spaced below the upper plenum member to define a plenum therebetween, and a plurality of burner tiles attached to the lower plenum member in a selected pattern, the broiler housing being shaped to define a broiler interior area, the upper plenum member dividing the broiler interior area into upper and lower portions, the broiler having heat-generating electrical components positioned in the upper portion of the broiler interior area, the upper portion of the broiler interior area communicating with the second air outlet in the first support arm to direct a flow of cooling air from the second air passageway into the upper portion of the broiler assembly and around the heat-generating electrical components, the upper portion of the broiler interior area communicating with the second exhausted cooling air inlet in the second support arm to allow the flow of cooling air to exit the upper portion of the broiler interior area as exhausted cooling air into the second exhausted cooling air passageway in the second support arm, the plenum communicating with the third air outlet of the second passageway portion of the second air supply portion to receive the gas and air mixture therefrom, the plenum being positioned to communicate with the broiler surface to provide the air and gas mixture thereto for ignition to generate broiling heat for cooking; and a gas line having a discharge outlet at the gas entry inlet in the first support arm and being couplable to the gas source to provide a selected amount of gas from the gas source into the second passageway portion of the second air passageway for mixing of the gas with the combustion air.

16. The conversion broiler assembly of claim 14 wherein the first broiler member includes a first stanchion attached to the rear housing and a first support arm connected to the first stanchion, the cooling air passageway having a first passageway portion extending through the first stanchion and a second passageway portion extending through the first support arm, the second passageway portion communicates with the upper portion of the broiler interior area.

17. The conversion broiler assembly of claim 16 wherein the first support arm has an air inlet that communicates with the first passageway portion of the cooling air passageway and first and second air outlets therein that communicate with the second passageway portion, the first support arm has a divider plate therein dividing the second passageway portion into first and second channels that are interconnected, the divider plate being positioned to direct the air from the first passageway portion past the first air outlet and into the first channel so a portion of the air flows through the first air outlet into the upper portion of the broiler interior area and a portion of the air flows through the first channel to the second channel and to the second air outlet.

18. The conversion broiler assembly of claim 16 further comprising an airflow adjusting apparatus attached to the first support arm in the second passageway portion and positioned to adjustably control an amount of air flowing through the second passageway portion.

19. The conversion broiler assembly of claim 14 the first and second broiler support members are movable laterally as a unit relative to the rear housing for lateral adjustability of the broiler relative to the rear housing and to the cooking surface of the cooking apparatus when the conversion broiler assembly is mounted to the cooking apparatus.

20. The conversion broiler assembly of claim 14 wherein the broiler includes a plurality of burner tiles arranged in a pattern having an outer set of burner tiles extending around and being spaced apart from an inner set of burner tiles to define a space having no burner tiles therein between the inner and outer sets of burner tiles.

21. The conversion broiler assembly of claim 14 wherein the broiler includes a ceramic burner tile holder having opposing upper and lower surfaces, the burner tile holder being spaced apart from the plenum with the upper surface facing the plenum member to define a plenum therebetween.

22. The conversion broiler assembly of claim 14, further including first and second exhaust separators extending between the first and second broiler support members, the first exhaust separator defining a first exhaust passageway spaced away from the second exhaust separators to direct a first exhaust from the cooking apparatus away from the cooking surface in a first layer, the second exhaust separator being spaced apart from the first exhaust separator and positioned to define a second exhaust passageway between the first and second exhaust separators to direct a second exhaust from the cooking apparatus away from the cooking surface in a second layer with the first layer being adjacent to the second layer.

23. The conversion broiler assembly of claim 14 wherein the rear housing has rail members and the first and second broiler support members have roller members that rollably engage the rail members for lateral movement of the first and second broiler support members relative to the rear housing.

24. The conversion broiler assembly of claim 23 wherein the rail members include first and second rail members, the first rail member having a first running surface that engages first selected ones of the roller members of the first and second broiler support members, the second rail member is substantially parallel to the first rail member and has a second running surface that supports second selected ones of the roller members, the first running surface defining a substantially vertically oriented plane and being positioned to react horizontal forces from the first selected ones of the roller members when the conversion broiler assembly is mounted to the cooking apparatus, and the second running surface being inclined and defining angled plane oriented at a selected angle relative to the vertically oriented plane, the second running surface being positioned to react vertical and horizontal forces from the second selected ones of the roller members when the conversion broiler assembly is mounted to the cooking apparatus.

25. The conversion broiler of claim 23 wherein the rail members include substantially parallel first and second rail members, the first rail member having a first running surface that engages first selected ones of the roller members of the first and second broiler support members and the second rail member having a second running surface that engages second selected ones of the roller members, the first and second running surfaces being substantially vertically oriented when the conversion broiler assembly is mounted to the cooking apparatus.

26. The conversion broiler assembly of claim 25 wherein the rail members include an inclined rail member that is substantially parallel to the first and second rail members, the inclined rail member having an inclined running surface positioned at a selected angle relative to the first and second running surfaces, the inclined running surface supports third selected ones of the roller members of the first and second broiler support members and reacts horizontal and vertical forces from the third selected ones of the roller members of the first and second broiler support members when the conversion broiler assembly is mounted to the cooking apparatus.

\* \* \* \* \*